United States Patent
Jamison (10) Patent No.: US 10,578,226 B2
(45) Date of Patent: Mar. 3, 2020

(54) VALVE WITH TWO-PIECE ADJUSTABLE CAN WITH INTEGRAL POLE PIECE

(71) Applicant: MAC Valves, Inc., Wixom, MI (US)

(72) Inventor: Michael Jamison, Fenton, MI (US)

(73) Assignee: MAC VALVES, INC., Wixom, MI (US)

( * ) Notice: Subject to any disclaimer, the term of this patent is extended or adjusted under 35 U.S.C. 154(b) by 76 days.

(21) Appl. No.: 15/819,525

(22) Filed: Nov. 21, 2017

(65) Prior Publication Data

US 2018/0180192 A1 Jun. 28, 2018

Related U.S. Application Data

(60) Provisional application No. 62/437,796, filed on Dec. 22, 2016.

(51) Int. Cl.
*F16K 11/044* (2006.01)
*F16K 31/06* (2006.01)
(Continued)

(52) U.S. Cl.
CPC ...... *F16K 31/0613* (2013.01); *F16K 11/0716* (2013.01); *F16K 27/029* (2013.01);
(Continued)

(58) Field of Classification Search
CPC ............. H01F 7/081; H01F 7/121–126; H01F 7/1607; F16K 31/0613; F16K 31/0627;
(Continued)

(56) References Cited

U.S. PATENT DOCUMENTS 3,529,620 A * 9/1970 Leiber ................ F16K 31/0606
137/269
4,525,695 A * 6/1985 Sheng .................. H01F 7/1615
137/625.65
(Continued)

FOREIGN PATENT DOCUMENTS

CN 104048090 A 9/2014
TW 201333357 A 8/2013
(Continued)

OTHER PUBLICATIONS

Office Action (with English translation) dated May 16, 2019 in corresponding Taiwan Application No. 106145186.

*Primary Examiner* — Craig J Price
(74) *Attorney, Agent, or Firm* — Harness, Dickey & Pierce, P.L.C.

(57) ABSTRACT

A multi-port valve having a longitudinal axis and a solenoid coil wound about a bobbin. Coaxially aligned with the longitudinal axis is an armature, at least partially disposed within the bobbin. The armature is coupled to a valve member that forms a sealing relationship with at least one valve orifice. A two-piece can having a first can component and a second can component that cooperate to define an interior region. The solenoid coil, bobbin, pole piece, and at least part of the armature are disposed in the interior region of the two-piece can. The second can component is adjustably threaded to the first can component such that a longitudinal dimension of the interior region of the two-piece can may be adjusted to vary the size of a gap between the pole piece and the armature.

20 Claims, 13 Drawing Sheets (51) Int. Cl.
*F16K 11/07* (2006.01)
*H01F 7/126* (2006.01)
*H01F 7/08* (2006.01)
*H01F 7/16* (2006.01)
*F16K 27/02* (2006.01)
*F16K 31/42* (2006.01)

(52) U.S. Cl.
CPC ...... *F16K 31/0627* (2013.01); *F16K 31/0675* (2013.01); *H01F 7/081* (2013.01); *H01F 7/126* (2013.01); *H01F 7/1607* (2013.01); *F16K 11/044* (2013.01); *F16K 31/0603* (2013.01); *F16K 31/423* (2013.01); *Y10T 137/8671* (2015.04)

(58) Field of Classification Search
CPC ............. F16K 31/0675; F16K 11/0716; F16K 27/029; F16K 31/0679; F16K 27/048; F16K 11/044; F16K 31/0603; F16K 31/423; Y10T 137/8671
USPC ................. 137/625.69; 335/258, 273, 274
See application file for complete search history.

(56) References Cited

U.S. PATENT DOCUMENTS

| | | | | |
|---|---|---|---|---|
| 4,966,195 A | * | 10/1990 | McCabe | F16H 61/0251 |
| | | | | 137/625.61 |
| 8,151,824 B2 | * | 4/2012 | Williams | F16K 31/0627 |
| | | | | 137/625.25 |
| 8,167,000 B2 | * | 5/2012 | Neff | F16K 27/0263 |
| | | | | 137/625.67 |
| 8,430,378 B2 | * | 4/2013 | Hutchings | F16K 31/0672 |
| | | | | 137/859 |
| 8,783,653 B2 | | 7/2014 | Jamison et al. | |
| 9,010,373 B2 | * | 4/2015 | Neff | F16K 31/0627 |
| | | | | 137/625.64 |
| 9,022,069 B2 | * | 5/2015 | Neff | F16K 39/022 |
| | | | | 137/601.18 |
| 9,074,699 B2 | * | 7/2015 | Jamison | F16K 1/34 |
| 2017/0064977 A1 | * | 3/2017 | Bischel | A23G 9/228 |

FOREIGN PATENT DOCUMENTS

WO  WO-2009-155083 A2  12/2009
WO  WO-2014-142855 A1  9/2014

* cited by examiner

VALVE WITH TWO-PIECE ADJUSTABLE CAN WITH INTEGRAL POLE PIECE

CROSS-REFERENCE TO RELATED APPLICATIONS

This application claims the benefit of U.S. Provisional Application No. 62/437,796, filed on Dec. 22, 2016. The entire disclosure of the application referenced above is incorporated herein by reference.

FIELD

The present disclosure relates to solenoid operated valves.

BACKGROUND

Solenoid operated valves provide control of a fluid, such as pressurized air, which may be used to operate equipment such as sorters, packaging machines, food processors, and the like. These valves may be operated for millions of cycles.

As exemplified by U.S. Pat. No. 8,783,653, solenoid valves typically comprise a pole piece and a concentric bobbin wound with a coil of inductor wire that is assembled into a one-piece outer casing or can. When the coil is energized, magnetic forces are produced that attract an armature, which is also disposed within the can. The armature defines a valve member that opens (or closes, depending on the valve configuration) to control the flow of fluid. Typically, the valve member or armature operates against a biasing member or spring, serving to urge the valve member to its state of rest when the coil is not energized.

SUMMARY

The subject disclosure provides for a multi-port valve comprising a valve body and a valve member slidingly disposed within the valve body along a longitudinal axis. The multi-port valve includes a solenoid coil extending about a bobbin and an armature. The armature is coaxially aligned with the longitudinal axis and at least part of the armature is slidingly disposed within the bobbin for movement along the longitudinal axis from a de-energized position to an energized position. The armature is configured to move to the energized position when electricity is supplied to the solenoid coil. The armature is coupled to the valve member such that the valve member is disposed in a sealing relationship with the valve body to close one or more ports in the valve body when the armature is in the de-energized position or energized position depending on the configuration of the multi-port valve. A pole piece is coaxially aligned with the longitudinal axis and disposed within at least part of the bobbin. A first can component is attached to the valve body. The first can component has a first threaded portion. The multi-port valve further comprises a second can component that has a second threaded portion. The second threaded portion of the second can component is adapted to mate with the first threaded portion of the first can component and thereby adjustably join the second can component to the first can component. The first and second can components cooperate to define an interior region. The coil, the bobbin, the pole piece, and at least part of the armature are disposed in the interior region of the first and second can components. The interior region has a longitudinal dimension measured along the longitudinal axis. The first and second can components are threadably adjustable to adjust the longitudinal dimension of the interior of the can. In other words, the longitudinal dimension of the interior region may be increased or decreased by rotating the first and second can components relative to one another about the longitudinal axis. This changes a longitudinal position of the pole piece relative to the armature and allows for the precise adjustment of a gap between opposing end surfaces of the pole piece and the armature.

The disclosed multi-port valve improves upon conventional valve designs in several respects. The disclosed valve can be assembled using fewer parts and can be assembled more quickly at a lower cost. In addition to eliminating several parts and machining steps needed to manufacture conventional valves, the disclosed multi-port valve exhibits better magnetic flux distribution, resulting in a solenoid coil that produces greater force for a given size. As a result of the greater force, the multi-port valve can operate more quickly. Operating speed is an extremely important factor in many applications, such as sorting machines, packaging machines, food processors, and the like.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DESCRIPTION OF THE PREFERRED EMBODIMENTS

Example embodiments will now be described more fully with reference to the accompanying drawings.

For purposes of explaining the adjustable two-piece can technology, an exemplary three-way valve has been illustrated in the drawings. It will be understood that the principles are readily applicable to other solenoid operated valve configurations, including two-way valves and four-way valves, for example.

Figure 1:
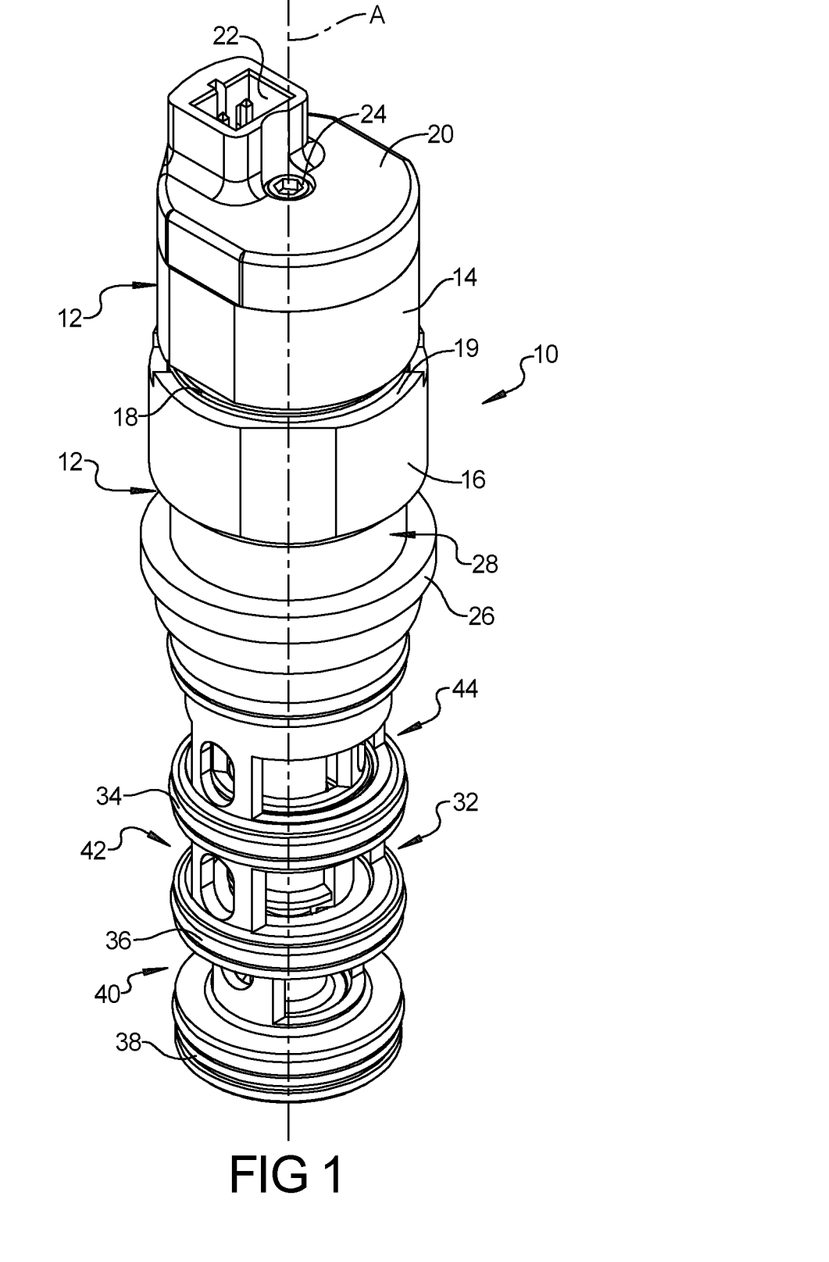
FIG. 1 is a top perspective view of a multi-port valve, showing the electrical connector.
Figure 2:
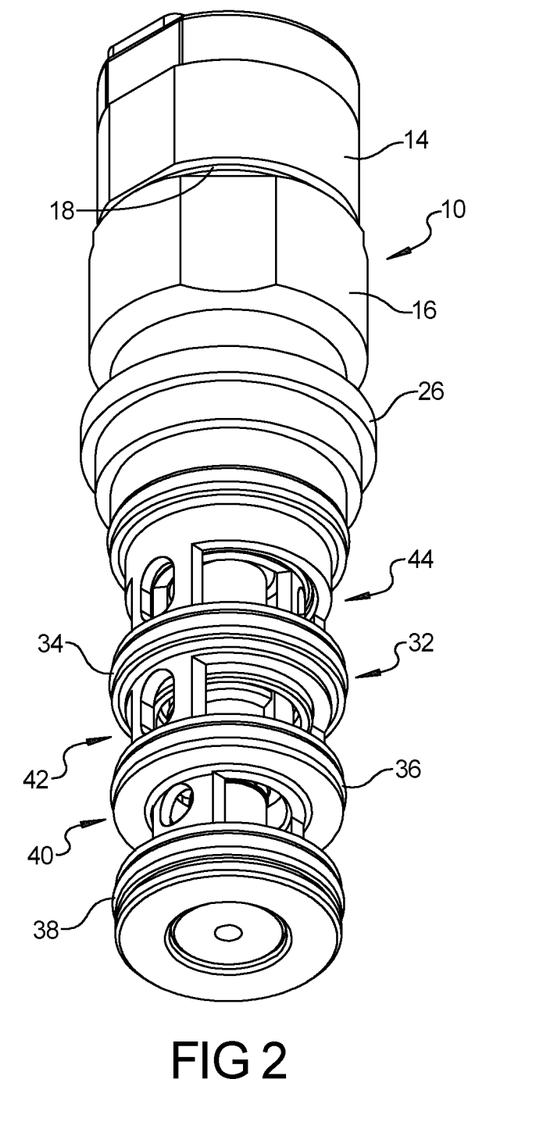
FIG. 2 is a bottom perspective view of the multi-port valve, showing the vent orifice.
Figure 3:
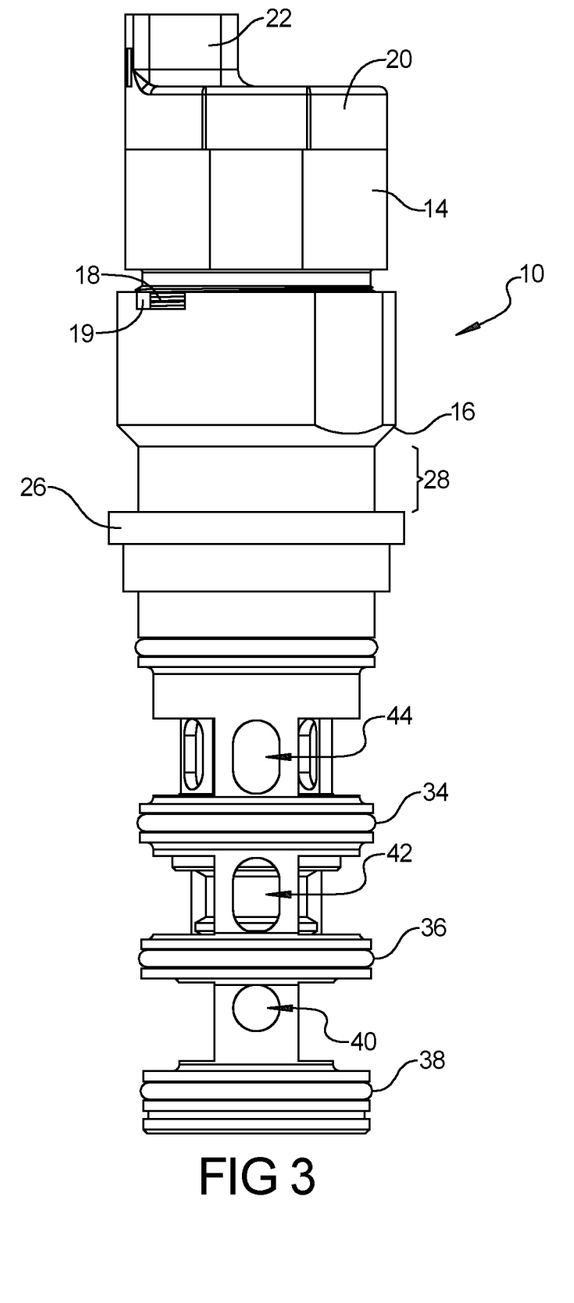
FIG. 3 is a front side view of the multi-port valve of FIGS. 1 and 2.
Figure 4:
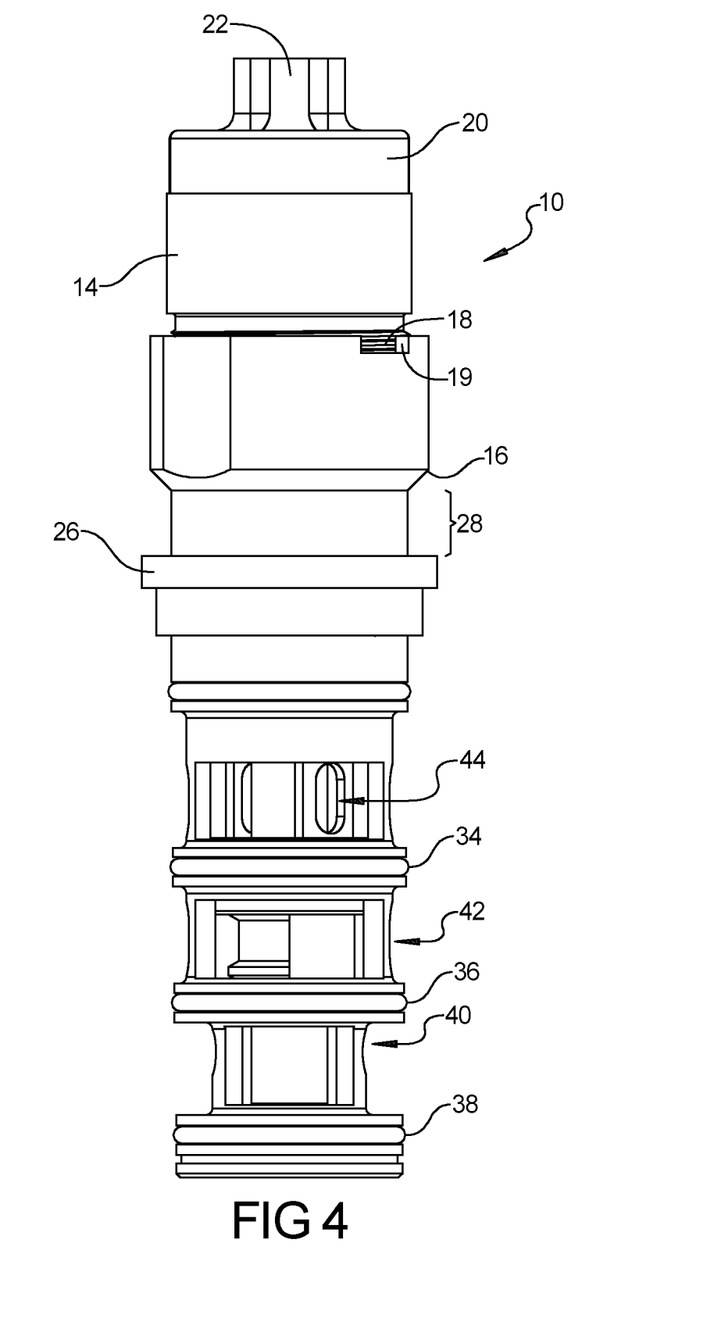
FIG. 4 is a right side view of the multi-port valve of FIGS. 1 and 2.
Figure 5:
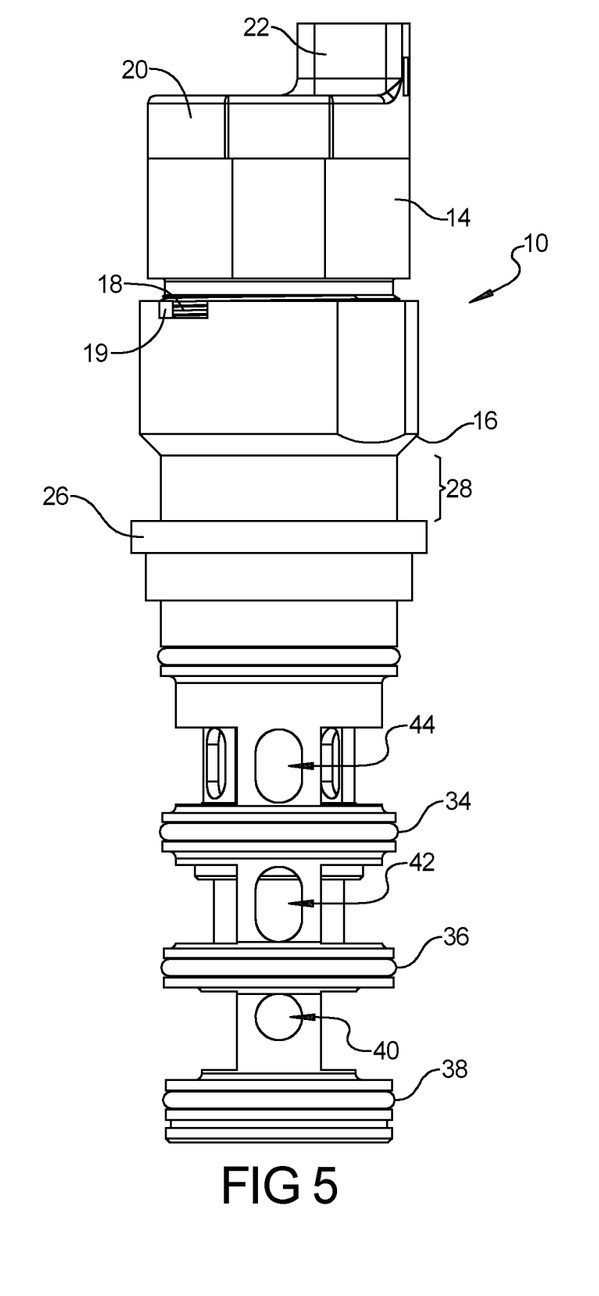
FIG. 5 is a back side view of the multi-port valve of FIGS. 1 and 2.
Figure 6:
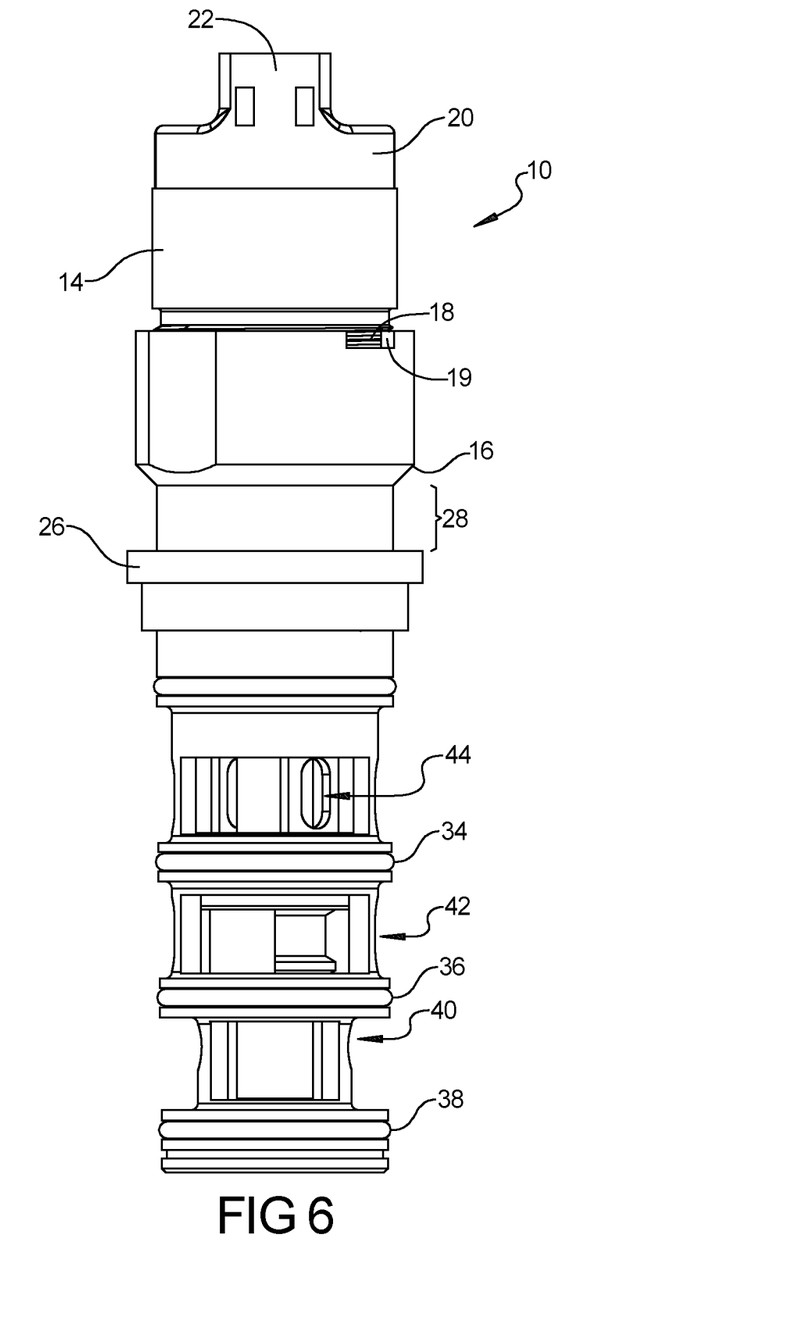
FIG. 6 is a left side view of the multi-port valve of FIGS. 1 and 2.

Referring to FIGS. 1 and 2, the multi-port valve 10 includes a two-piece can 12 that serves as the outer housing around the electromagnetic components of the solenoid valve operator. The multi-port valve 10 has a longitudinal axis A. The first can component 14 is threaded into the second can component 16. More specifically, the first can component 14 has a first threaded portion 18 that threadably engages a second threaded portion 19 of the second can component 16. An end cap 20 of the first can component 14 is provided with an outwardly protruding electrical connector 22. The end cap 20 is secured to the first can component 14 by a fastener 24, such as a hex bolt, the details of which can be better seen in FIGS. 8 and 9 discussed below.

Figure 10:
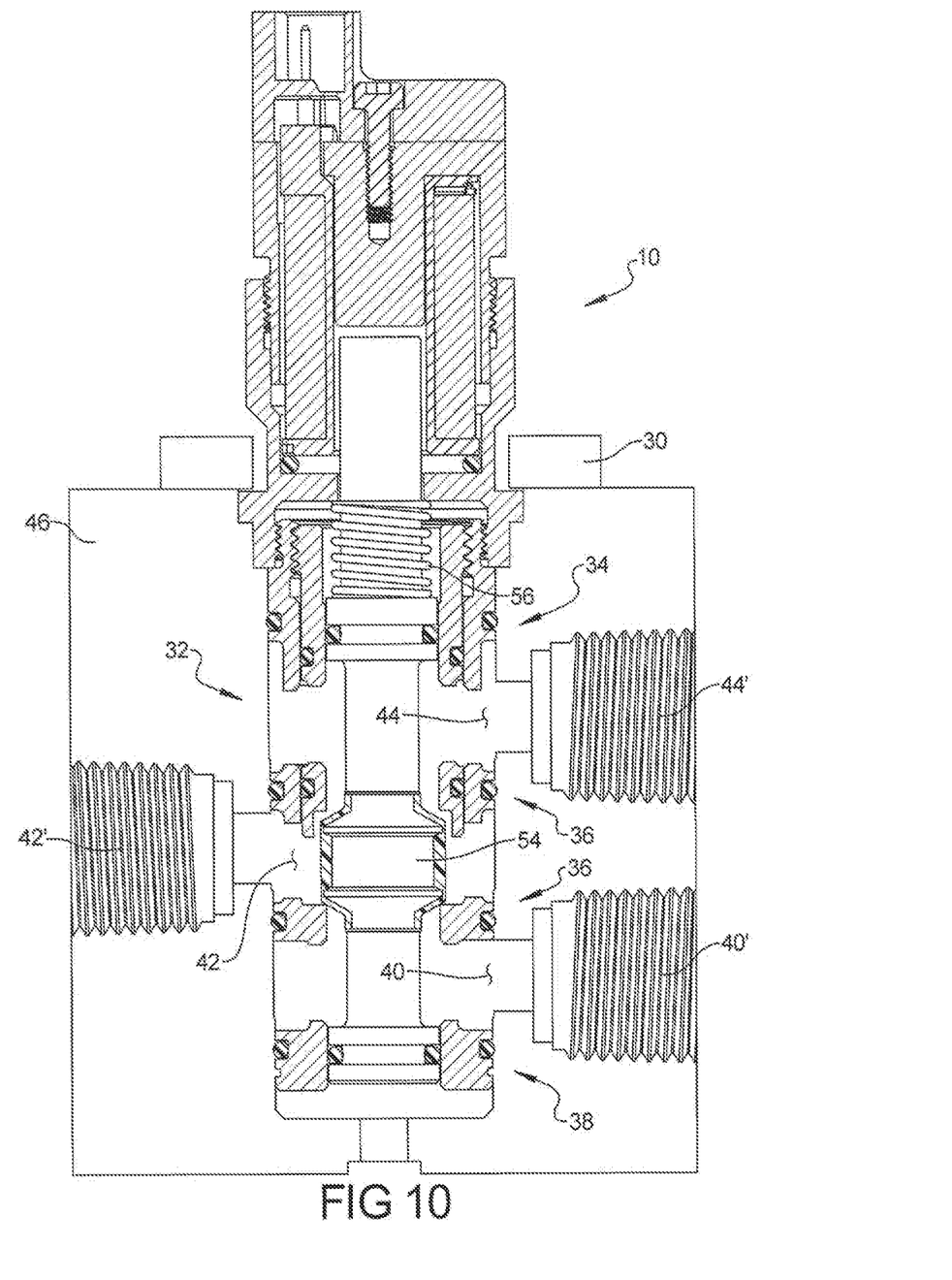
FIG. 10 is a cross-sectional view of the multi-port valve of FIG. 9 mounted in an exemplary manifold, illustrating the multi-port valve in use.

The second can component 16 is provided with an annular shoulder that serves as a seat 26 for mating the multi-port valve 10 to a manifold 46, as illustrated in FIG. 10, described more fully below. The second can component 16 is also provided with a waist 28 of reduced diameter that accommodates a hold-down plate 30, as seen in FIG. 10.

Figure 11A:
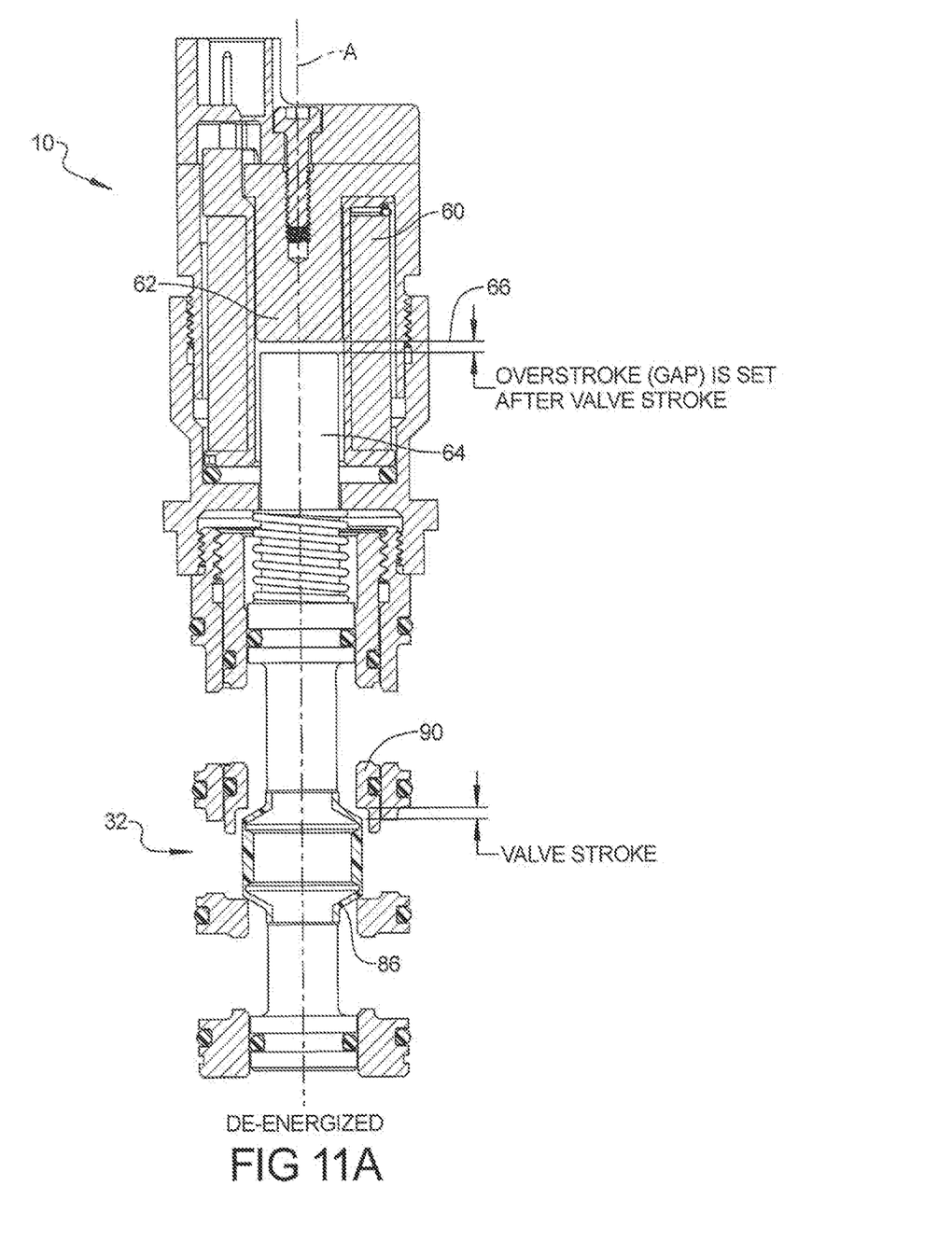
FIG. 11A is a cross-sectional view of the multi-port valve of FIG. 9 in its de-energized position.
Figure 11B:
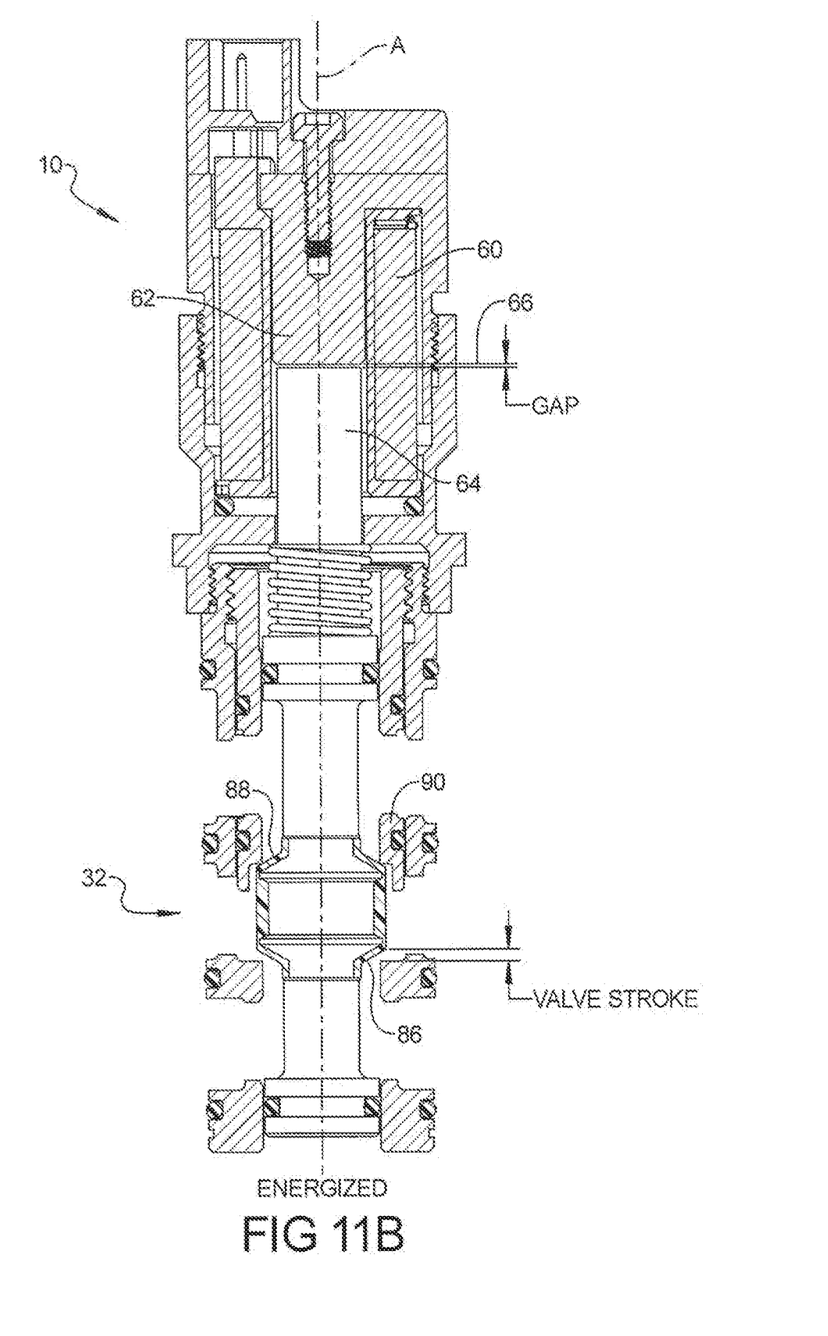
FIG. 11B is a cross-sectional view of the multi-port valve of FIG. 9 in its energized position.

Referring to FIG. 10, the exemplary multi-port valve 10 is a three-way valve that has a valve body 32 provided with O-ring sealing structures 34, 36 and 38, that are designed to provide seals between the inlet, outlet and exhaust ports 40, 42 and 44, respectively. The O-ring sealing structures 34, 36, and 38 may be integral or separate from the valve body 32. In FIG. 10, the valve body 32 has been inserted into manifold 46. The manifold 46 has threaded couplings 40', 42', and 44' that are disposed in fluid communication with the respective inlet, outlet and exhaust ports 40, 42 and 44. FIG. 10 shows the valve member 54, which serves as the operative valve sealing member, used to open and close the multi-port valve 10 to control fluid flow. By way of example and without limitation, the valve member 54 may be geometrically shaped as a poppet or spool valve. The valve member 54 is slidingly disposed within the valve body 32 between a resting position (FIG. 11A) and an actuated position (FIG. 11B). FIG. 10 also shows a biasing member 56, such as a spring, which urges the valve member 54 to its resting position (the position assumed when solenoid coil 60 is not energized). A further discussion of the valve member 54 and biasing member 56 is provided below in connection with FIGS. 11A and 11B.

Figure 7A:
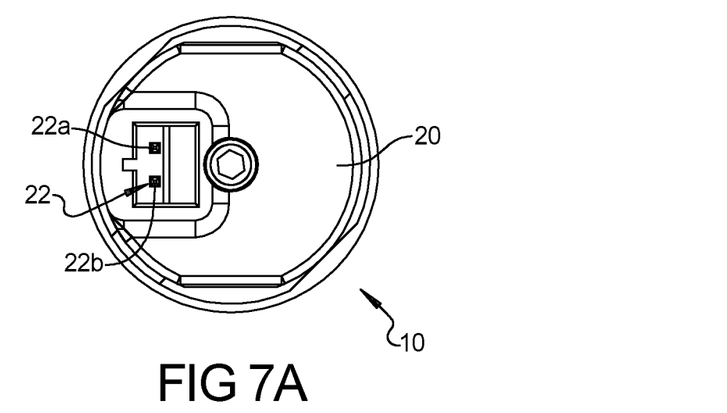
FIG. 7A is a top view of the multi-port valve of FIGS. 1 and 2.
Figure 7B:
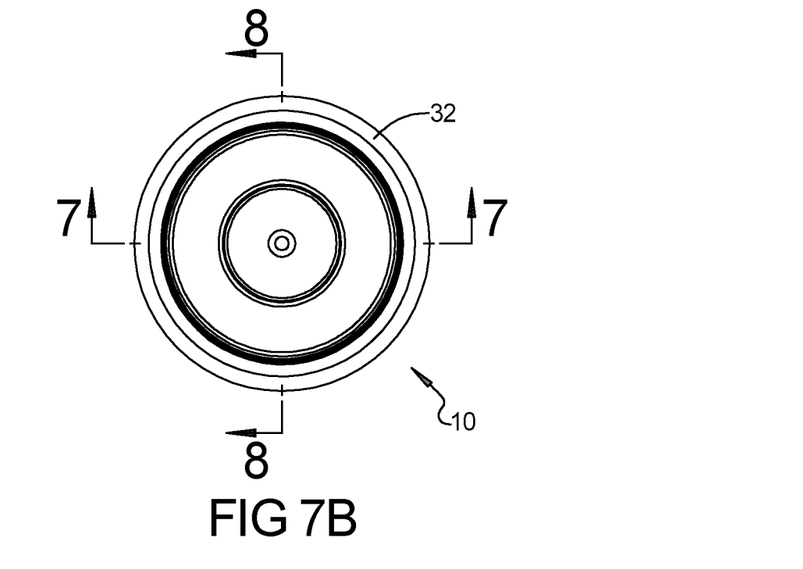
FIG. 7B is a bottom view of the multi-port valve of FIGS. 1 and 2.
Figure 8:
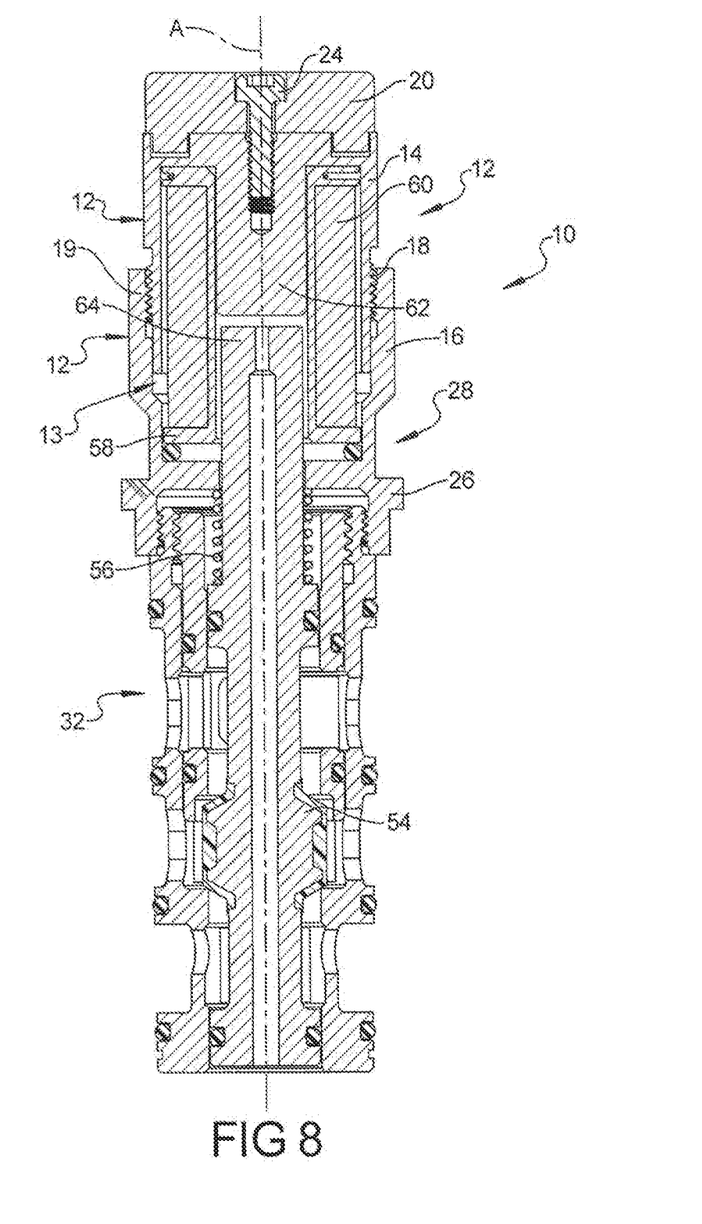
FIG. 8 is a cross sectional view of the multi-port valve taken substantially along the line 8-8 in FIG. 7B.
Figure 9:
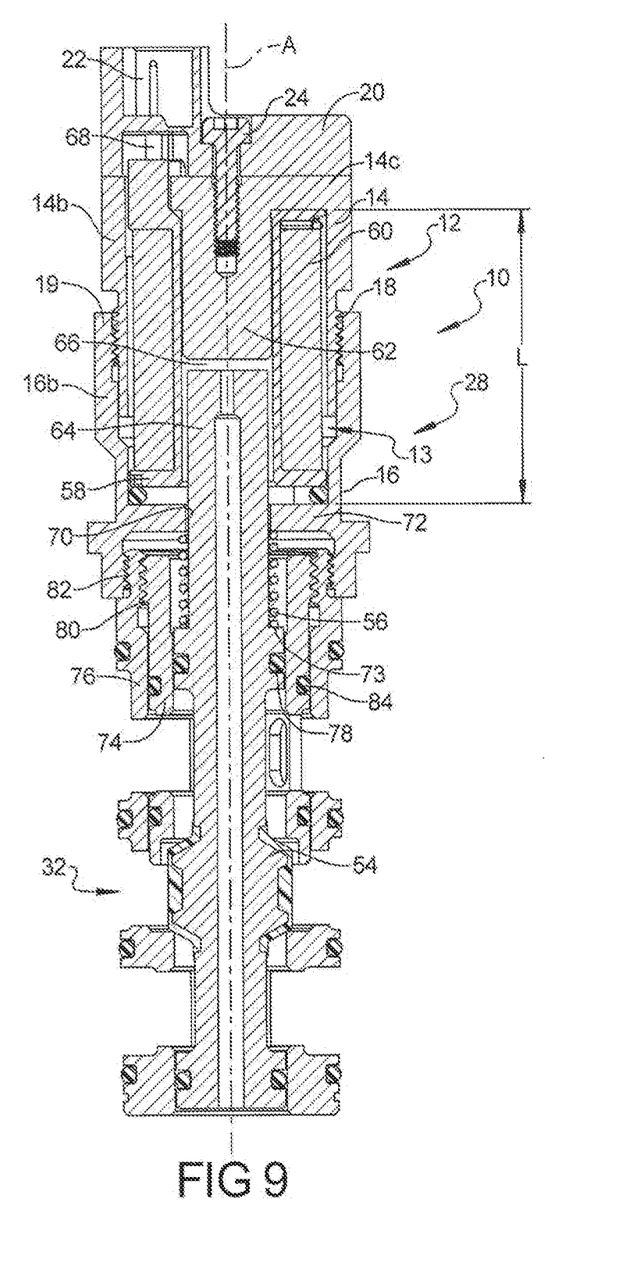
FIG. 9 is a cross sectional view of the multi-port valve taken along the line 9-9 in FIG. 7B.

Referring to FIGS. 7A, 8 and 9, the two-piece can 12 houses the electrical solenoid components including the bobbin 58 about which a solenoid coil 60 is wrapped. The ends of the solenoid coil 60 are coupled to first and second conductor prongs 22a and 22b of the electrical connector 22 (the first and second conductor prongs 22a and 22b being visible in FIG. 7A). As illustrated in FIG. 9, the first can component 14 comprises a cylindrical body portion 14b and a contiguous closed end portion 14c. The second can component 16 also includes a cylindrical body portion 16b. Together, the first can component 14 and the second can component 16 define an interior region 13. A pole piece 62 is disposed within the interior region 13. Optionally, the pole piece 62 is contiguous with the closed end portion 14c of the first can component 14 and extends longitudinally into the interior region 13. Alternatively, the pole piece 62 is a separate component that is attached to the closed end portion 14c of the first can component 14.

Figure 12:
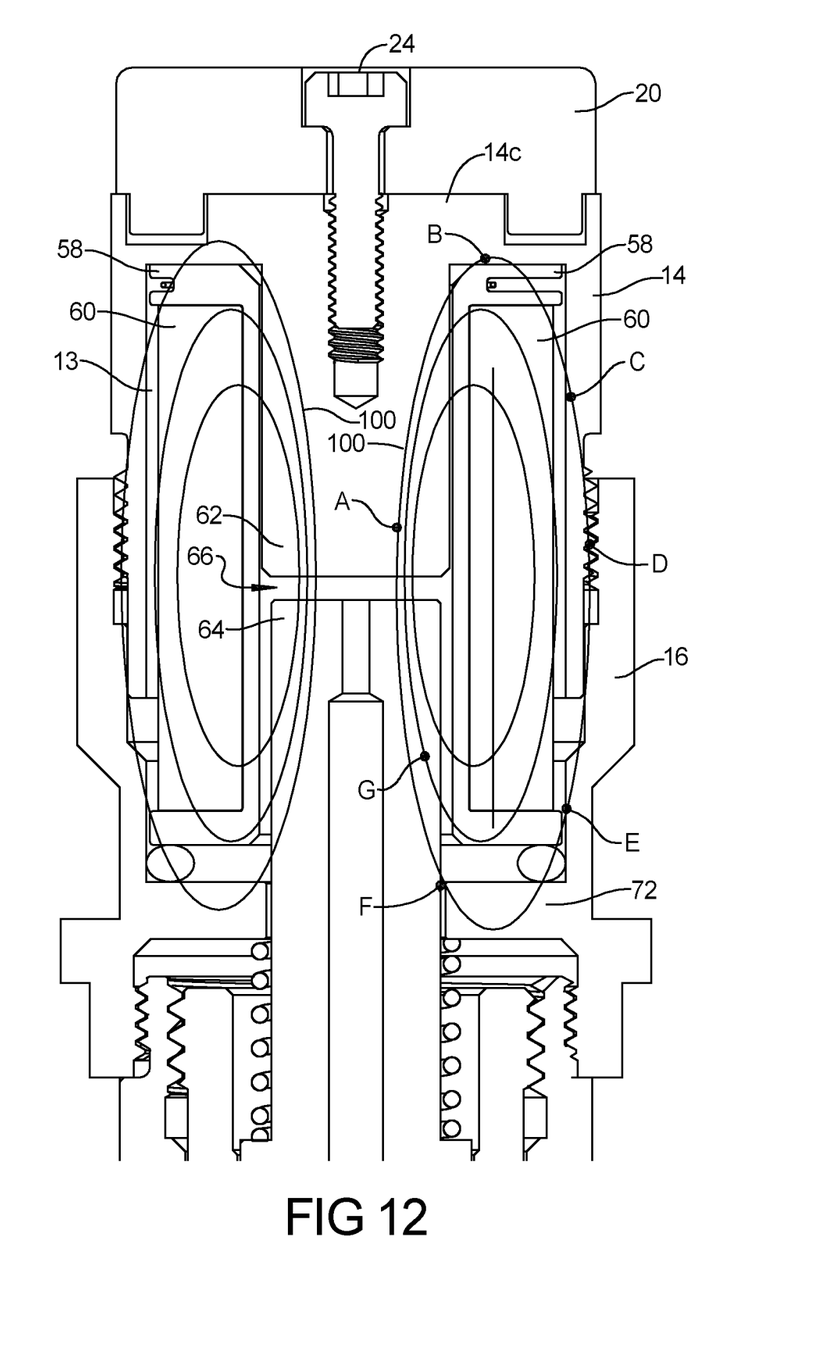
FIG. 12 is an enlarged view of the two-piece adjustable can assembly of the multi-port valve shown in FIG. 9, illustrating how the magnetic flux lines are concentrated.

As illustrated in FIG. 12, the pole piece 62 and the closed end portion 14c define a continuous and gapless magnetic flux path that will be explained more fully below.

Referring to FIGS. 9 and 12, the bobbin 58 and the solenoid coil 60 are inserted, as an assembly, into the interior region 13. As illustrated, approximately one half of the bobbin 58 encircles the pole piece 62. The remaining half of the bobbin 58 encircles an armature 64, allowing for a small gap 66 between the pole piece 62 and the armature 64.

The end cap 20, with electrical connector 22, as seen in FIG. 9, is secured by a fastener 24 to the closed end portion 14c of the first can component 14. Electrical continuity between the electrical connector 22 and the solenoid coil 60 is provided through the metal conductor structure 68 formed in or carried by the bobbin 58, as shown in FIG. 9.

Referring to FIG. 9, the first threaded portion 18 of the first can component 14 and the second threaded portion 19 of the second can component 16, allow the two can components 14, 16 to be adjustably connected by threading the two can components 14, 16 together. The second can component 16 has a longitudinally extending bore 70 through an annular flange portion 72 that is sized to receive the armature 64, with sufficient spacing to allow reciprocating movement of the armature 64 between a de-energized position (FIG. 11A) and an energized position (FIG. 11B). The interior region 13 of the first and second can components 14, 16 has a longitudinal dimension L that extends parallel to the longitudinal axis A. The longitudinal dimension L of the interior region 13 is measured between the inward facing surface of the flange portion 72 of the second can component 16 and the closed end portion 14c of the first can component 14. As will be explained below, the longitudinal dimension L is adjustable. The outwardly facing surface of the annular flange portion 72 serves as a shoulder against which one end of the biasing member 56 presses to return the armature 64 to the de-energized position. The other end of biasing member 56 contacts an axially outwardly extending shoulder portion 73 of the armature 64. This other end of the biasing member 56 applies a biasing force that urges the armature 64 to its de-energized position. When electricity is supplied to the solenoid coil 60, a magnetic force is created that pulls the armature 64 towards the pole piece 62 and to the energized position, compressing biasing member 56.

A threaded coupler 74 mates with the valve body 32 to support the armature 64 in the second can component 16. The threaded coupler 74 provides an inner circumferential surface that defines a seal with an O-ring 78 disposed about an enlarged diameter portion of the armature 64. The valve body 32 is threaded onto the threaded coupler 80, and is further threaded at 82 into the open end of the second can component 16. An O-ring seal 84 is provided between the threaded coupler 74 and the valve body 32.

The valve member 54 slides with the armature 64. The valve member 54 may be integral with the armature 64 or may be a separate component that is attached to the armature 64. The valve member 54 and its operation in opening and closing the multi-port valve 10 can best be seen in FIGS. 11A and 11B. FIG. 11A shows the armature 64 in the de-energized position. When the armature 64 is in the de-energized position, the distal end 86 of the valve member 54 makes resting contact with the valve body 32. FIG. 11B shows the armature 64 in the energized position. When the armature 64 is in the energized position, the proximal end 88 of the valve member 54 makes sealing contact with valve seat 90. The valve member 54 can be provided with an elastomeric jacket or over-molding to aid in forming a tight seal.

In comparing FIGS. 11A and 11B, it is noted that the gap 66 is reduced in size when the solenoid coil 60 is energized. The longitudinal dimension L of the interior region 13 and therefore the precise spacing of the gap 66 can be adjusted with great precision by turning the first and second threaded portions 18, 19 of the first and second can components 14, 16 relative to one another. In some applications, physical contact between the pole piece 62 and the armature 64 may be desired. In such cases, this contact is facilitated by the threaded coupling between the first and second can components 14, 16. In other applications, it may be desirable to be able to precisely adjust the force with which the solenoid coil 60 pulls the armature 64 when energized. This too can be adjusted, by rotating the first and second can components 14, 16 about the longitudinal axis A and relative to one another to adjust the size of the gap 66. A greater pulling force is developed as the armature 64 is situated closer to the pole piece 62 (i.e., reducing the gap 66 and thus concentrating the magnetic flux). Conversely, a reduced pulling force is developed as the armature 64 is moved further from the pole piece 62 (i.e., increasing the gap 66 and thus diminishing the magnetic flux). Thus by adjusting the longitudinal dimension L of the interior region 13, the magnetic pulling force can be quite accurately fine-tuned.

In contrast with conventional solenoid valve designs, the disclosed two-piece can 12 with a pole piece 62 that is part of the first can component 14 produces stronger solenoid pulling forces, by creating a magnetic flux path having minimal gaps or discontinuities. This will be more fully explained with referenced to FIG. 12.

FIG. 12 shows how exemplary magnetic lines of flux 100 generated by the solenoid coil 60 are concentrated through the pole piece 62 and the armature 64. The magnetic lines of flux 100 define closed paths, here illustrated as elongated ellipses. The first and second can components 14, 16 are fabricated from steel or other ferromagnetic material. As such, the first and second can components 14, 16 provide a very good flux path that concentrates the magnetic flux where it will have maximal influence on the armature 64. Generally, speaking, while ferromagnetic materials provide a good flux path, air gaps provide a much poorer flux path. Thus, the unitary construction of the pole piece 62 and first can component 14, and the tightly threaded physical coupling between the first and second can components 14, 16, results in a closed flux path circuit with air gaps being largely eliminated.

This is illustrated by flux line 100 for example, tracing how the path traverses from the pole piece 62 at point A, through the closed end portion 14c of the first can component 14 at point B, through the outer shell of the first can component 14 at point C, through the threaded coupling between the first and second can components 14, 16 at point D, through the second can component at point E and then finally across a small gap between the annual flange portion 72 of the second can component 16 and the armature 64 at point F and into the armature 64 at point G. Except for the small gap at point F, provided to allow sliding movement of the armature 64, the flux path illustrated by flux line 100 is able to traverse essentially two unitary steel structures that are themselves joined by a closely threaded connection that provides practically no air gap.

This concentration of the magnetic flux lines 100 by the integral construction of the first can component 14 and pole piece 62, and the concentration by the closely threaded connection between the two can components 14, 16, gives a measurable improvement in flux concentration when compared with conventional constructions whose assemblies incorporate inner component spacing that effect air gaps over large surface areas. This improvement translates into stronger attractive forces acting on the armature 64 when the solenoid coil 60 is energized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-port valve, comprising:
   a valve body including at least one port;
   a valve member slidingly disposed within the valve body along a longitudinal axis;
   a first can component is connected to the valve body, the first can component having a cylindrical body portion and a first threaded portion;
   a second can component having a cylindrical body portion and a second threaded portion that is adapted to mate with the first threaded portion and thereby adjustably join the second can component to the first can component, the first and second can components cooperating to define an interior region;
   a pole piece disposed within the interior region of the first and second can components;
   a solenoid coil disposed within the cylindrical body portion of the first can component and the cylindrical body portion of the second can component, wherein the solenoid coil extends annularly about the pole piece; and
   an armature coaxially aligned with the longitudinal axis, at least part of the armature being slidingly disposed within the solenoid coil for movement along the longitudinal axis from a de-energized position to an energized position when electricity is supplied to the solenoid coil, the armature being coupled to the valve member such that the valve member is disposed in a sealing relationship with the valve body to open and close the at least one port in the valve body,
   wherein the interior region has a longitudinal dimension that is adjustable by rotating the first and second can components relative to one another about the longitudinal axis to change a longitudinal position of the pole piece relative to the armature.

2. The multi-port valve according to claim 1, wherein a gap is defined between the pole piece and the armature when the armature is in the de-energized position, wherein the gap increases with an increase in the longitudinal dimension of the interior region to reduce magnetic attraction between the pole piece and the armature, and wherein the gap decreases with a decrease in the longitudinal dimension of the interior region to increase magnetic attraction between the pole piece and the armature.

3. The multi-port valve according to claim 2, wherein the pole piece is a separate part that is structurally attached to the first can component.

4. The multi-port valve according to claim 2, wherein the pole piece is integral with the first can component.

5. The multi-port valve according to claim 3, wherein the first can component includes a body portion and a contiguous closed end portion and wherein the pole piece extends longitudinally from the contiguous closed end portion of the first can component.

6. The multi-port valve according to claim 1, further comprising:
a biasing member disposed in contact with at least one of the armature and the valve member that biases the armature toward the de-energized position.

7. The multi-port valve according to claim 6, wherein the second can component includes an annular flange portion, wherein the armature includes an outwardly extending shoulder portion, and wherein the biasing member extends helically about the armature and longitudinally between the annular flange portion of the second can component and the outwardly extending shoulder portion of the armature.

8. The multi-port valve according to claim 1, wherein the first and second can components are made of ferromagnetic material.

9. The multi-port valve according to claim 1, wherein the valve body is threadably joined to the second can component.

10. A multi-port valve, comprising:
a valve body including at least one port;
a valve member slidingly disposed within the valve body along a longitudinal axis;
a solenoid coil extending about a bobbin;
an armature coaxially aligned with the longitudinal axis, at least part of the armature being slidingly disposed within the bobbin for movement along the longitudinal axis from a de-energized position to an energized position when electricity is supplied to the solenoid coil, the armature being coupled to the valve member such that the valve member is disposed in a sealing relationship with the valve body to close the at least one port when the armature is in one of the de-energized and energized positions;
a pole piece disposed within at least part of the bobbin;
a first can component is connected to the valve body, the first can component having a cylindrical body portion and a first threaded portion;
a second can component having a cylindrical body portion and a second threaded portion adapted to mate with the first threaded portion and thereby adjustably join the second can component to the first can component, the first and second can components cooperating to define an interior region; and
an end cap that is secured to the first can component,
wherein the coil and the bobbin are disposed in the cylindrical body portion of the first can component and the cylindrical body portion of the second can component,
wherein the pole piece and at least part of the armature are disposed in the interior region,
wherein the interior region has a longitudinal dimension that is adjustable by rotating the first and second can components relative to one another about the longitudinal axis to change a longitudinal position of the pole piece relative to the armature.

11. The multi-port valve according to claim 10, wherein a gap is defined between the pole piece and the armature when the armature is in the de-energized position, wherein the gap increases with an increase in the longitudinal dimension of the interior region to reduce magnetic attraction between the pole piece and the armature, and wherein the gap decreases with a decrease in the longitudinal dimension of the interior region to increase magnetic attraction between the pole piece and the armature.

12. The multi-port valve according to claim 11, wherein the pole piece is integral with the first can component.

13. The multi-port valve according to claim 12, wherein the first can component includes a body portion and a contiguous closed end portion and wherein the pole piece extends longitudinally from the contiguous closed end portion of the first can component.

14. The multi-port valve according to claim 11, wherein the pole piece is a separate part that is structurally attached to the first can component.

15. The multi-port valve according to claim 10, further comprising:
a biasing member disposing in contact with at least one of the armature and the valve member that biases the armature toward the de-energized position.

16. The multi-port valve according to claim 15, wherein the second can component includes an annular flange portion, wherein the armature includes an outwardly extending shoulder portion, and wherein the biasing member extends helically about the armature and longitudinally between the annular flange portion of the second can component and the outwardly extending shoulder portion of the armature.

17. The multi-port valve according to claim 10, wherein the first and second can components are made of ferromagnetic material.

18. A multi-port valve, comprising:
a valve body including at least one port;
a valve member slidingly disposed within the valve body along a longitudinal axis;
a first can component is connected to the valve body, the first can component having a first threaded portion;
a second can component having a second threaded portion adapted to mate with the first threaded portion and thereby adjustably join the second can component to the first can component, the first and second can components cooperating to define an interior region;
a solenoid coil that is disposed within the interior region of the first and second can components;
a pole piece at least partially disposed within the solenoid coil; and
an armature coaxially aligned with the longitudinal axis, at least part of the armature being slidingly disposed within the solenoid coil for movement along the longitudinal axis from a de-energized position to an energized position when electricity is supplied to the solenoid coil, the armature being coupled to the valve member such that the valve member is disposed in a sealing relationship with the valve body to open and close the at least one port in the valve body,
wherein the interior region has a longitudinal dimension that is adjustable by rotating the first and second can components relative to one another about the longitudinal axis to change a longitudinal position of the pole piece relative to the armature,
wherein the pole piece and the first can component are integral and form a one-piece structure that defines a continuous and gapless magnetic flux path.

19. The multi-port valve according to claim 18, wherein the second can component has an annular shoulder that serves as a seat for mating the multi-port valve to a manifold.

20. The multi-port valve according to claim 18, wherein the second can component has a waist of reduced diameter that accommodates a hold-down plate.

* * * * *